US008820970B2

(12) United States Patent
Nicole (10) Patent No.: US 8,820,970 B2
(45) Date of Patent: Sep. 2, 2014

(54) LIGHTING SYSTEM HAVING A WINDOW INCLUDING A PHOTOLUMINESCENT MATERIAL (75) Inventor: Céline Catherine Sarah Nicole, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/812,170

(22) PCT Filed: Jul. 25, 2011

(86) PCT No.: PCT/IB2011/053296
§ 371 (c)(1),
(2), (4) Date: Jan. 25, 2013

(87) PCT Pub. No.: WO2012/017351
PCT Pub. Date: Feb. 9, 2012

(65) Prior Publication Data
US 2013/0119870 A1      May 16, 2013

(30) Foreign Application Priority Data

Aug. 4, 2010  (EP) ..................................... 10171863

(51) Int. Cl.
*F21V 23/04*     (2006.01)
*H05B 37/02*     (2006.01)
*E06B 9/24*      (2006.01)

(52) U.S. Cl.
CPC ........... *H05B 37/02* (2013.01); *E06B 2009/247* (2013.01); *E06B 2009/2476* (2013.01); *Y02B 80/50* (2013.01); *E06B 9/24* (2013.01)
USPC .......................................... 362/276; 362/279

(58) Field of Classification Search
CPC .............. F21S 9/03; F21S 9/037; E06B 9/04; E06B 9/26; E06B 2009/247; E06B 2009/26; E06B 2009/264; E06B 2009/2643; E06B 2009/322; E06B 9/386
See application file for complete search history.

(56) References Cited

U.S. PATENT DOCUMENTS

| | | | |
|---|---|---|---|
| 2001/0047851 A1 | 12/2001 | Weidenbach | |
| 2002/0149312 A1* | 10/2002 | Roberts et al. | 313/495 |
| 2006/0043336 A1* | 3/2006 | van Schoor | 252/301.36 |

FOREIGN PATENT DOCUMENTS

| | | |
|---|---|---|
| DE | 1174476 B | 7/1964 |
| DE | 29918618 U1 | 2/2000 |
| DE | 102009019635 A1 | 11/2010 |
| WO | 2008135893 A1 | 11/2008 |

\* cited by examiner

*Primary Examiner* — Donald Raleigh
(74) *Attorney, Agent, or Firm* — Yuliya Mathis (57) ABSTRACT The invention relates to a window (1), in particular, a building window, wherein the window comprises photoluminescent material (2) located within the window. The photoluminescent material (2) is preferentially a phosphorescent material provided on a sun blind which is located within a sealed space (5) between two transparent plates (3, 4) of the window. The photoluminescent material can be charged up by daylight and during the night the photoluminescent material can emanate light. Since the photoluminescent material is located within the window, the photoluminescent material is protected against environmental influences, in particular, against humidity, thereby increasing the lifetime of the photoluminescent material and, thus, of the window. The invention relates further to an object, in particular, a building, comprising the window, thereby giving the object an ambient glow.

8 Claims, 5 Drawing Sheets

LIGHTING SYSTEM HAVING A WINDOW INCLUDING A PHOTOLUMINESCENT MATERIAL

FIELD OF THE INVENTION

The invention relates to a window for an object, an object comprising the window, a lighting system and a method for modifying the appearance of the object.

BACKGROUND OF THE INVENTION

U.S. Pat. No. 6,601,634 B2 discloses a window cover apparatus that includes a window cover substrate and a mechanism for adjusting the configuration of the substrate relative to a window. Illuminating material such as phosphorescent material is provided on or in the substrate to provide illumination in darkness. The illuminating material may contain a color pigment and may be configured to provide a colorful design in both daylight and darkness.

Environmental influences like humidity affect the illuminating material adversely, thereby reducing the lifetime of the window cover apparatus.

SUMMARY OF THE INVENTION

It is an object of the present invention to provide a window for an object, which allows to generate light and which has an increased lifetime.

In a first aspect of the present invention a window for an object is presented, wherein the window comprises photoluminescent material located within the window. Since the photoluminescent material is located within the window, the photoluminescent material is protected against environmental influences, in particular, against humidity, thereby increasing the lifetime of the photoluminescent material and, thus, of the window, which generates light by using the photoluminescent material.

It is preferred that the photoluminescent material is sealingly located within the window. Since the photoluminescent material is sealingly located within the window, the degree of protection of the photoluminescent material against environmental influences is further increased, thereby further increasing the lifetime of the photoluminescent material.

The window is preferably a building window for being used in a building.

It is further preferred that the window comprises at least two transparent plates defining a sealed space in which the photoluminescent material is located. The window comprises preferentially two or three glass plates defining at least one sealed space containing, for example, a vacuum or neutral gas. The sealed space is therefore preferentially used for sealing the photoluminescent material and for providing a temperature and/or noise protection of the inside of, for example, a building comprising the window.

It is further preferred that the photoluminescent material is a phosphorescent material. The phosphorescent material can be charged up during, for example, daylight, and the phosphorescent material can then emit phosphorescent light during, for example, darkness. Moreover, the photoluminescent material is preferentially non-radioactive and non-toxic. The photoluminescent material is, for example, Super-LumiNova from the company RC TRITEC.

It is further preferred that a sun blind is integrated within the window, wherein the sun blind comprises the photoluminescent material. The sun blind with the photoluminescent material is preferentially located within the space defined between at least two transparent plates, which is preferentially sealed. Moreover, the sun blind is preferentially covered with the photoluminescent material.

It is further preferred that the sun blind comprises a first side and a second side, wherein at least one of the first side and the second side comprises the photoluminescent material.

It is further preferred that the first side is covered with a first photoluminescent material and the second side is covered with a second photoluminescent material being different to the first photoluminescent material. For example, the first and second photoluminescent materials can comprise different colors.

It is further preferred that the sun blind comprises several lamellae being covered with the photoluminescent material. Preferentially, the first side and the second side of the sun blind are formed by a first side and a second side of the lamellae. At least one of the sides of the lamellae can be covered by the photoluminescent material. The lamellae are preferentially rotatable by at least 180°.

It is further preferred that the window comprises at least one of a time providing unit, a light sensor, a presence sensor and a movement sensor for generating at least one of a time signal, a light signal, a presence signal and a movement signal, wherein the light signal is indicative of ambient light and/or light emitted by the photoluminescent material, the presence signal is indicative of a presence of an object within a predefined area and the movement signal is indicative of a movement of an object within a predefined area, wherein the sun blind is controllable based on at least one of the time signal, the light signal, the presence signal and the movement signal. A control of the sun blind based on the presence signal and/or based on the movement signal allows an interaction of the window with the ambience.

The time providing unit is, for example, a clock for providing the time of the day or for providing the time which has lapsed since a starting time. In an embodiment, the sun blind can be controlled such that the first side and the second side are shown at different times to the outside and/or the inside of a building comprising the window depending on the time signal, thereby allowing presenting a temporally changing pattern, in particular, a temporally changing color pattern.

The light sensor can be adapted to sense the light outside of a building comprising the window for determining whether it is day or night, for instance, by determining whether the sensed light exceeds a predefined threshold or not. During night, the sun blind can be controlled such that a side of the sun blind, in particular, sides of the lamellae, comprising the photoluminescent material is directed to the outside of the building, whereas during day the sun blind can be controlled such that the side comprising the photoluminescent material is directed to light inside or outside the building. Preferentially, during the day the sun blind is controlled such that the side comprising the photoluminescent material is illuminated by daylight, in particular, uniformly illuminated by daylight.

The light sensor can also be adapted to sense the light emitted by the photoluminescent material, wherein the sun blind can be controlled such that the side of the sun blind with the largest emitted light intensity is directed to a predefined direction, for example, to the outside or the inside of a building comprising the window.

In an embodiment, single lamellae are controllable depending on, for example, the time signal, the sensed light, the presence signal and/or the movement signal. If single lamellae are independently controllable, a large variety of patterns can be generated. The sun blind is preferentially also manually controllable.

It is further preferred that the photoluminescent material forms a pattern. For example, the photoluminescent material can form letters, signs et cetera.

It is further preferred that the window comprises a light source for illuminating the photoluminescent material. The light source is preferentially a light emitting diode (LED). Several LEDs can be provided on lamellae of a sun blind for charging the photoluminescent material up, if the daylight is not sufficient and/or if a side of the sun blind comprising a photoluminescent material is directed to the inside of, for example, a building comprising the window.

In a further aspect of the present invention, an object comprising a window as defined in claim 1 is presented. The object is preferentially a building comprising the window.

In a further aspect of the present invention a lighting system is presented, wherein the lighting system comprises:
  a window as defined in claim 1,
  at least one of a time providing unit, a light sensor, a presence sensor and a movement sensor for generating at least one of a time signal, a light signal, a presence signal and a movement signal, wherein the light signal is indicative of ambient light and/or light emitted by the photoluminescent material, the presence signal is indicative of a presence of an object within a predefined area and the movement signal is indicative of a movement of an object within a predefined area,
  a sun blind integrated within the window and comprising the photoluminescent material, and
  a control unit for controlling the sun blind depending on at least one of the time signal, the light signal, the presence signal and the movement signal.

In another aspect of the present invention, a method for modifying the appearance of an object is presented, the object comprising a window, wherein photoluminescent material is located within the window, wherein a sun blind is integrated within the window and wherein the sun blind comprises the photoluminescent material, wherein the method comprises:
  generating at least one of a time signal, a light signal, a presence signal and a movement signal by at least one of a time providing unit, a light sensor, a presence sensor and a movement sensor, wherein the light signal is indicative of ambient light and/or light emitted by the photoluminescent material, the presence signal is indicative of a presence of an object within a predefined area and the movement signal is indicative of a movement of an object within a predefined area,
  controlling the sun blind based on at least one of the time signal, the light signal, the presence signal and the movement signal. The object is preferentially a building, i.e. the method allows preferentially modifying the appearance of a building.

In another aspect of the present invention a computer program for modifying the appearance of an object is presented, wherein the computer program comprises program code means for causing a lighting system as defined in claim 13 to carry out the steps of the method as defined in claim 14, when the computer program is run on a computer controlling the lighting system.

It shall be understood that the window of claim 1, the object of claim 12, the lighting system of claim 13, the method of claim 14 and the computer program of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

BRIEF DESCRIPTION OF THE DRAWINGS

In the following drawings.

DETAILED DESCRIPTION OF EMBODIMENTS

Figure 1:
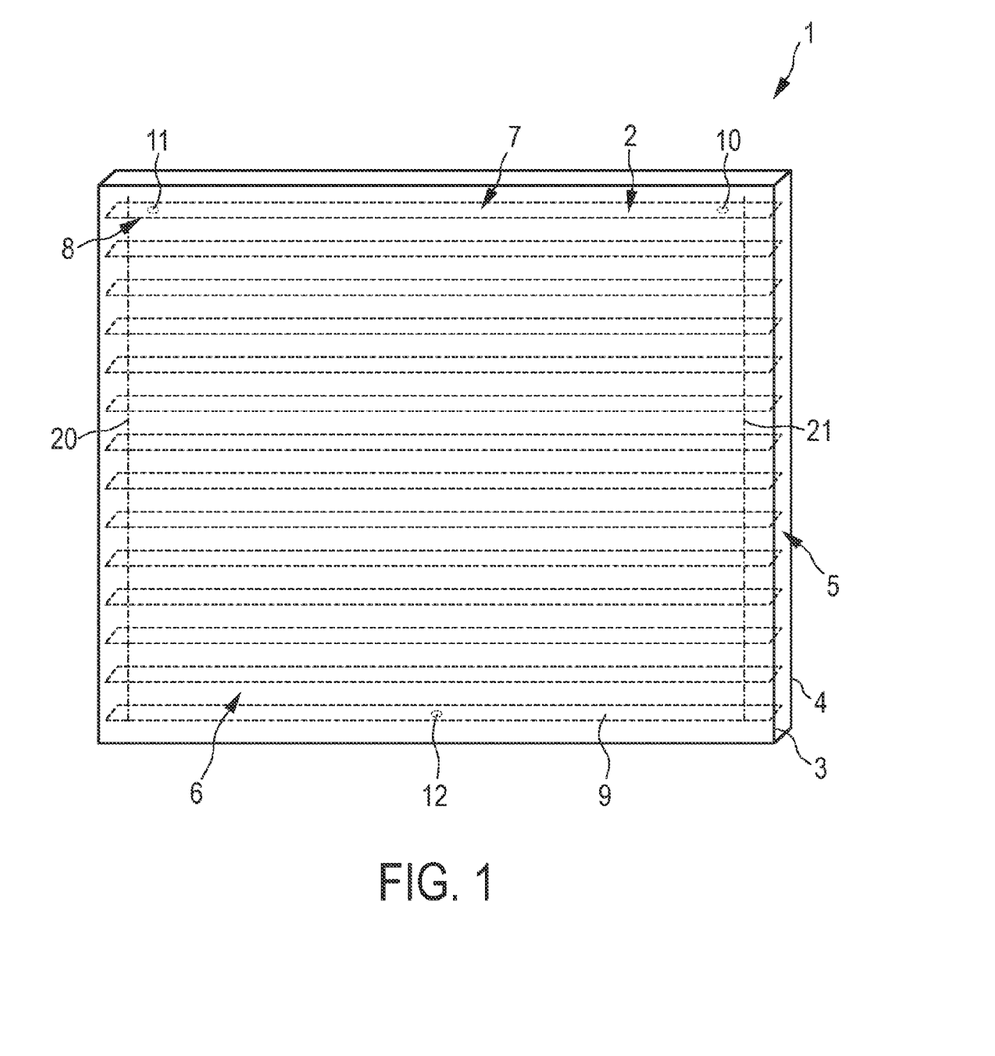
FIG. 1 shows schematically and exemplarily an embodiment of a building window.

FIG. 1 shows schematically and exemplarily a building window 1 comprising two transparent plates 3, 4 defining a sealed space 5 in which a sun blind 6 is located. The sun blind 6 comprises several lamellae 9 being covered with photoluminescent material 2. The sealed space 5 can contain a vacuum or neutral gas.

In this embodiment, the photoluminescent material 2 is a phosphorescent material being non-radioactive and non-toxic.

A phosphorescent material does not immediately re-emit the radiation it absorbs. The slower time scales of the re-emission are associated with "forbidden" energy state transitions in quantum mechanics. As these transitions occur less often in certain materials, absorbed radiation may be re-emitted at a lower intensity for up to several hours.

In simpler terms, phosphorescence is a process in which energy absorbed by a phosphorescent material is released relatively slowly in the form of light. This is the mechanism used for "glow-in-the-dark" materials which are "charged" by exposure to light. While in general the phosphorescent material may contain radium or tritium which might be dangerous for health, in the present embodiment, as already mentioned above, a non-radioactive and non-toxic phosphorescent material is used like Super-LumiNova from the company RC TRITEC.

The lamellae 9 comprise a first side 7 and a second side 8. In the position of the lamellae 9 shown in FIG. 1, the first side 7 is the upper side and the second side 8 is the lower side. The first sides 7 of the lamellae 9 form a first side of the overall sun blind 6, if the sun blind 6 is closed. Correspondingly, the second sides 8 of the lamellae 9 form a second side of the sun blind 6, if the sun blind 6 is closed. The first sides 7 of the lamellae 9 form therefore a first side of the sun blind and the second sides 8 of the lamellae 9 form a second side of the sun blind 6. In this embodiment, the phosphorescent material 2 is coated on the first sides 7 of the lamellae 9. In another embodiment, both sides 7, 8 of the lamellae 9 can be coated with the phosphorescent material. In particular, the first side can be covered with a first phosphorescent material and the second side can be covered with a second phosphorescent material being different to the first phosphorescent material. For example, the first and second phosphorescent materials can comprise different colors.

The lamellae 9 are thin plastic rectangular shaped lamellae comprising the phosphorescent material 2. The lamellae 9 are connected together with threads 20, 21 in a known way, in order to allow the lamellae to be rotated over an angle of, for example, 180° C. and to be moved up and down for arranging the sun blind in a desired position.

Light sensors 10, 11, 12 are arranged on some of the lamellae 9 for generating a light signal being indicative of ambient light and/or light emitted by the phosphorescent material 2, wherein the sun blind 6 is controllable based on the light signal.

Figure 2:
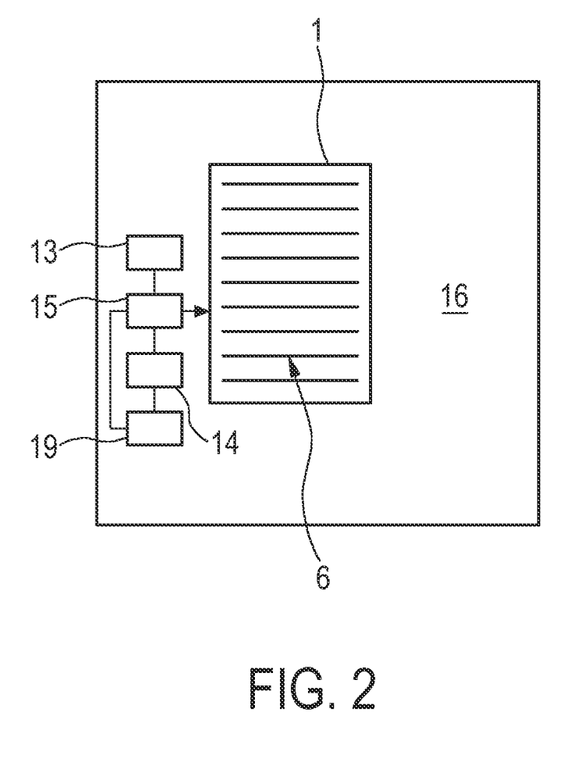
FIG. 2 shows schematically and exemplarily the building window within a wall of a building.

FIG. 2 shows schematically and exemplarily the building window 1 with the sun blind 6 within a wall 16 of a building. On the wall 16, a presence sensor 13 and a movement sensor 14 for generating a presence signal and a movement signal, respectively, are arranged. The presence signal is indicative of a presence of an object within a predefined area and the movement signal is indicative of a movement of an object within the predefined area. The predefined area is, for example, an area in front of the building or within an inner room of the building. The presence sensor and the movement sensor are, for example, based on a known infrared detection technique. Moreover, a clock 19 is provided as a time providing unit for providing a time signal.

A control unit 15 is provided for controlling the sun blind 6 depending on at least one of the light signal generated by the light sensors 10, 11, 12, the presence signal generated by the presence sensor 13, the movement signal generated by the movement sensor 14, and the time signal generated by the clock 19. In particular, the control unit 15 is adapted to control the angular position of the lamellae 9 depending on at least one of these signals. For example, the control unit 15 can be adapted to control the sun blind 6 depending on the time such that, for example, the first side 7 and the second side 8 of the lamellae 9 are shown at predetermined times to the outside and/or the inside of the building, thereby allowing presenting a temporally changing pattern, in particular, a temporally changing color pattern.

In this embodiment, the light sensors 10, 11, 12 sense the light outside of the building for determining whether it is day or night, for instance, by determining whether the sensed light exceeds a predefined threshold or not. The threshold can be predefined by calibration measurements, wherein the intensity of the light is sensed, while it is know whether it is day or night. The control unit 15 can be adapted such that, during night, a side of the sun blind 6, in particular, the first sides 7 of the lamellae, which comprise the phosphorescent material 2, is directed to the outside of the building, whereas during the day the sun blind 6 can be controlled such that the side comprising the phosphorescent material is directed to light being inside or outside the building for charging up the phosphorescent material. Preferentially, the control unit 15 is adapted such that during the day the first side 7 comprising the phosphorescent material 2 is substantially uniformly illuminated by daylight. For example, the angular positions of the lamellae 9 can be controlled such that the first sides 7 are uniformly illuminated by the daylight.

The angular positions of the lamella 9, which lead to a substantially uniform illumination by daylight, depend on, for example, the orientation of the building with respect to the sun, the position of the building window with respect to the building, the shape of the building, et cetera. After the building window has been installed in the building, the appropriate angular positions of the lamellae, which ensure a substantially uniform illumination by daylight, can easily be determined by a user, for example, by try-and-error. The determined angular positions of the lamellae 9 can then be input into the control unit 15, in order to allow the control unit 15 to control the angular positions of the lamellae 9 such that the first sides 7 are uniformly illuminated by daylight.

The light sensors 10, 11, 12 can also be adapted to sense the light emitted by the phosphorescent material, wherein the sun blind 6 can be controlled such that a side of the sun blind 6 with the largest emitted light intensity is directed to a predefined direction, for example, to the outside or the inside of the building.

Since, in this embodiment, the sun blind 6 is also controlled based on the presence signal and on the movement signal, the building window 1 can interact with the ambience. For example, if a person enters a predefined area in front of the building, the sun blind 6 can be controlled such that the color of the sun blind 6, which can be seen from the outside, is modified.

The sun blind 6 is preferentially also adapted to allow a manual control of the sun blind 6.

The control unit 15, the clock 19, the presence sensor 13 and/or the movement sensor 14 can be integrated into a window frame or can be arranged on or within a wall of the building in which the building window is included.

Optionally, several LEDs can be provided on the lamellae 9 of the sun blind 6 for charging the phosphorescent material up, if the daylight is not sufficient and/or if a side of the sun blind 6 comprising the phosphorescent material is directed to the inside of the building. In particular, the control unit 15 can be adapted to determine whether the phosphorescent material 2 has received enough light depending on the light signal generated by the light sensors 10, 11, 12 and to control the LEDs such that they illuminate the phosphorescent material 2, if the phosphorescent material 2 has not received enough light.

Figure 3:
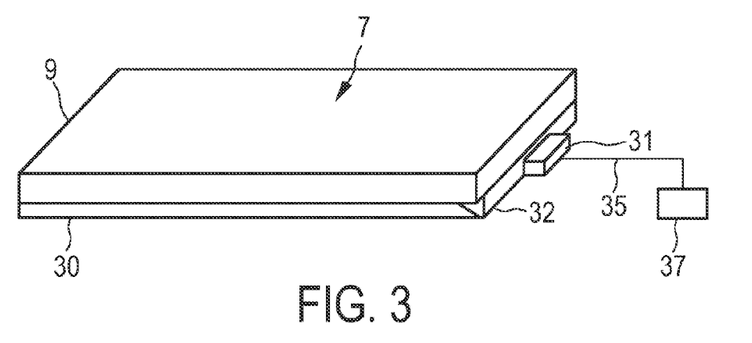
FIG. 3 shows schematically and exemplarily a lamella comprising an LED.

FIG. 3 shows schematically and exemplarily how a lamella 9 can be provided with an LED 31. One surface of the lamella 9 is covered with a waveguide 30, wherein light of the LED 31 is coupled into the waveguide via a known incoupling structure 32. The surface of the waveguide 30, which faces the lamella 9, comprises outcoupling structures allowing the light within the waveguide 30 to leave the waveguide 30 in the direction of the lamella 9. Preferentially, the outcoupling structures are designed such that the lamella 9 is uniformly illumined by the outcoupled light. The LED 31 is connected via an electrical connection 35 with a power source 37 which can be controlled by the control unit 15. The power source 37 can be integrated into a frame of the building window or can be placed on a wall or within a wall close to the building window. In the embodiment shown in FIG. 3 only the first side 7 of the lamella 9 is covered with the phosphorescent material and the lamella 9 is transparent to the outcoupled light, in order to allow the outcoupled light to illuminate the phosphorescent material arranged on the first side 7 of the lamella 9.

Figure 4:
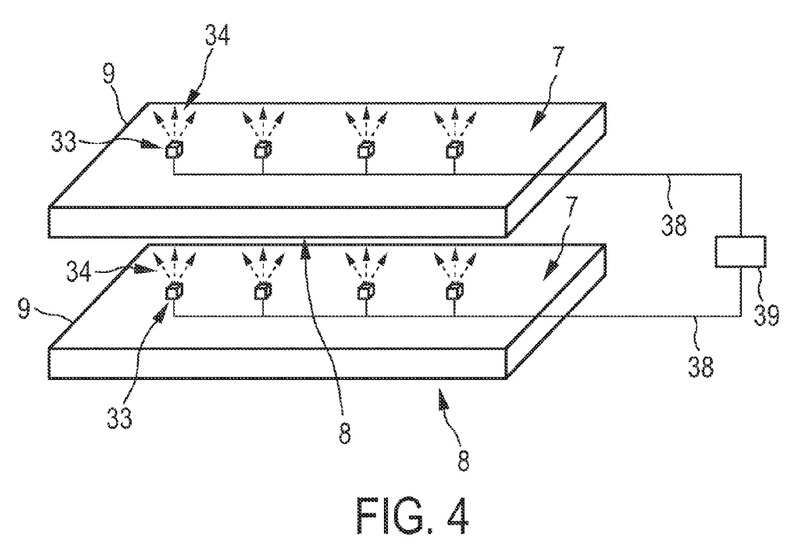
FIG. 4 shows schematically and exemplarily two lamellae comprising an arrangement of LEDs.

FIG. 4 shows schematically and exemplarily a further possible arrangement of LEDs 33 on the lamellae 9. In this embodiment, on the first side 7 of the lamellae 9 LEDs 33 for emitting light 34 are arranged. The LEDs 33 comprise preferentially an optical element like a lens for broadening the light 34 in order to more homogenously illuminate a neighboured lamella 9. In this embodiment, the LEDs 33 are equidistantly arranged. The phosphorescent material is preferentially located on the second side 8 of the lamella 9 only, wherein the second side 8 of the lamella 9 is illuminated by the light 34 of the LEDs 33 of an adjacent lamella. The LEDs 33 are connected to a power source 39 via electrical connections 38, wherein the power source 39 can be controlled by the control unit 15. Several power sources can be provided for controlling the different LEDs 33 individually. It is also possible that the LEDs of a lamella are simultaneously controlled and are connected to the same power source. In a further embodiment, all LEDs of all lamellae can be connected to the same power source being controlled by the control unit 15. Also the power source 39 can be integrated into a frame of the building window or can be placed on a wall or within a wall close to the building window.

The phosphorescent material 2 can be uniformly distributed on the respective lamella or the photoluminescent material can be coated in a pattern. For example, the phosphorescent material 2 can form letters, signs et cetera.

The building window 1, the clock 10, the light sensors 10, 11, 12, the presence sensor 13, the movement sensor 14, the sun blind 6 and the control unit 15 can be regarded as a lighting system for providing an ambience lighting. The lighting system for providing an ambience lighting can further comprise the above mentioned LEDs which can be controlled by the control unit 15.

Figure 5:
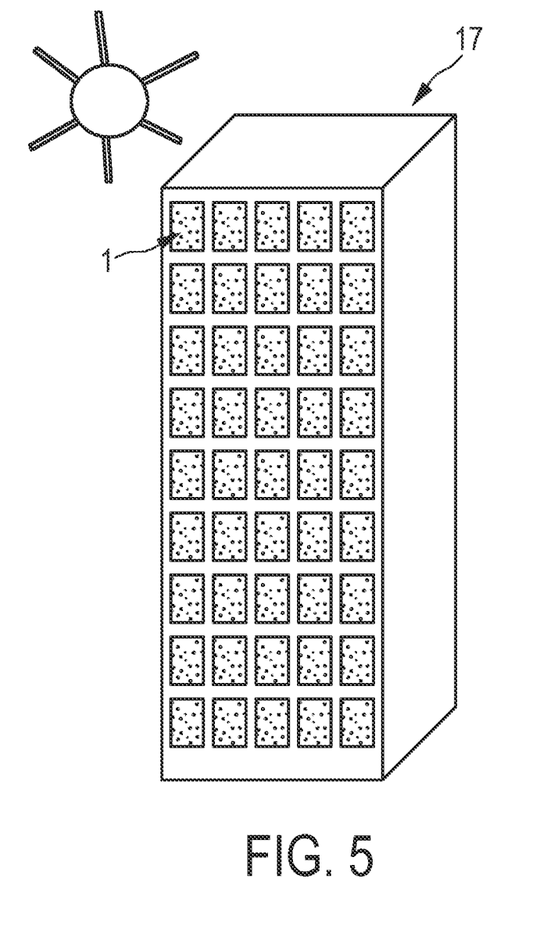
FIG. 5 shows schematically and exemplarily an embodiment of a building comprising several building windows during the day.

FIG. 5 shows schematically and exemplarily a building 17 comprising several building windows 1 during the day. During the day, the sides of the lamellae 9, which comprise the phosphorescent material 2, are faced to the outside of the building such that the phosphorescent material can be charged up. During the night, which can be detected by using the light sensors 10, 11, 12, the phosphorescent material 2 emits phosphorescent light.

Figure 6:
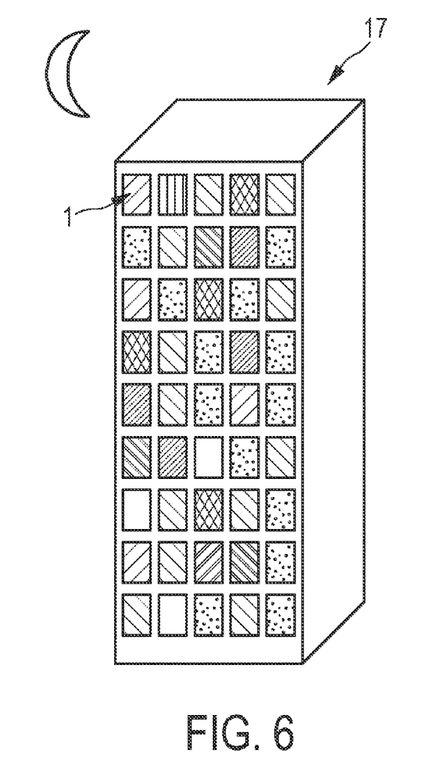
FIGS. 6 and 7 show exemplarily and schematically embodiments of buildings comprising several building windows during the night.

In FIG. 6, it is shown that different building windows 1 can emit different colors. Thus, different building windows can comprise different phosphorescent materials. The control unit can be adapted such that the phosphorescent material of all building windows is directed to the outside or such that only some of the building windows direct their phosphorescent material to the outside. In FIG. 6 an embodiment is shown, wherein some of the different building windows show different colors caused by emitted phosphorescent light and some further building windows do not show phosphorescent light.

Figure 7:
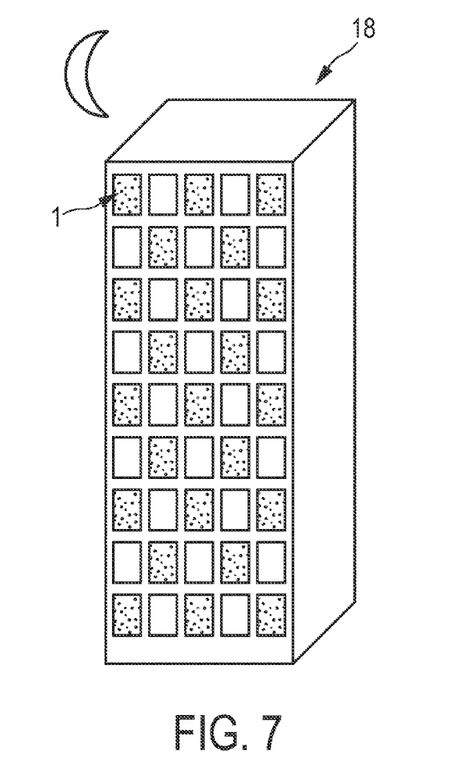

FIG. 7 shows schematically and exemplarily a further embodiment of a building comprising the building windows 1 during the night. The building 18 shown in FIG. 7 comprises several building windows 1, which have the same phosphorescent material and which provide therefore the same color. In FIG. 7, some building windows show the side with the phosphorescent material to the outside and some other building windows show the side with the phosphorescent material to the inside of the building, thereby generating a pattern which is visible from the outside of the building. The control unit 15 can be adapted such that a desired pattern is generated, which is visible from the outside of the buildings 17 and 18.

Figure 8:
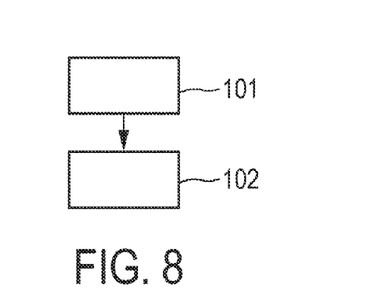
FIG. 8 shows a flowchart exemplarily illustrating an embodiment of a method for modifying the appearance of a building.

FIG. 8 shows a flowchart exemplarily illustrating a method for modifying the appearance of a building. In step 101, at least one of a time signal, a light signal, a presence signal and a movement signal are generated by at least one of the time providing unit 19, the light sensors 10, 11, 12, the presence sensor 13 and the movement sensor 14, wherein the light signal is indicative of ambient light and/or light emitted by the phosphorescent material, the presence signal is indicative of a presence of an object within a predefined area and the movement signal is indicative of a movement of an object within a predefined area. In step 102, the sun blind 6 is controlled based on at least one of the time signal, the light signal, the presence signal and the movement signal.

In contrast to providing lighting, in particular, green lighting, for buildings by using LEDs, the use of the photoluminescent material, in particular, of the phosphorescent material, allows to the create zero energy ambient glows for indoor and outdoor applications used in an automated system with daylight measurement, if LEDs are not used for charging up the photoluminescent material. Thus, an energy consumption as required by LEDs is preferentially not needed, if the sun blind with the photoluminescent material within the building window is used.

The building window can provide an ambient lighting for buildings, in particular, an outdoor or indoor coloured architecture lighting can be provided. An indoor ambience can be created, which offers visitors an "experience".

Building glass materials can be made of double or triple glass layers perfectly sealed with vacuum or neutral gas in between glass plates. This gives a good isolation for heat and sound. The sun blind, i.e. a sun shading element, can be integrated in between two glasses, wherein the sun blind can be controlled manually or automatically by measuring the sun/day light intensity. The control unit 15 can use a simple electronic circuit to read the signals emitted by, for example, the light sensors. The lamellae of the sun blind can be used like a sun screen with the lamellae rotating by 180 degrees. One side, or both sides, of the lamellae can be covered with a phosphorescent material. When the light gets dark outside, the light sensors can give a light signal which causes the control unit to rotate the lamellae. Rotation could be done automatically or mechanically. If both sides of the lamellae are covered with phosphorescent material, the colour can be changed to give the glow pattern a different geometry, for example, every day or every minute. If only one side of the lamellae is covered, a given pattern can be changed, thereby giving the effect of having a moving structure like on a display, wherein the building windows correspond to the pixels of the display. Indoor the effect is less visible, when the indoor lighting is on. But, in the evening, for example, when office hours are passed, and if lights are switched off, a glow could be still visible and give enough light for safety purposes. The light sensor can monitor the light emitted by the phosphorescent material and the lamellae can be controlled such that the most glowing surface faces the outdoor, or the indoor, side of the building window. The lamellae can be used for interior decoration.

In addition to the photoluminescent material, in particular, in addition to the phosphorescent material, the window can comprise further pigments. These further pigments can be sprayed or painted on the sun blind or mixed within the material of the sun blind. For example, the additional pigments can be sprayed or painted on lamella of a sun blind or mixed into a plastic material of the lamellae.

Although in the above described embodiments the sun blind is comprised of several lamellae, in other embodiments another kind of sun blind can be used like a continuous sun screen, wherein at least one side of the sun screen comprises photoluminescent material.

Although in the above described embodiments the photoluminescent material is provided on a sun blind, which is integrated into the building window, in other embodiments the photoluminescent material can also directly be provided within the building window or by using another element not being a sun blind.

Although in above described embodiments the photoluminescent material is a phosphorescent material, in other embodiments also another photoluminescent material can be used like a fluorescent material. Moreover, although in the above mentioned embodiments certain phosphorescent materials are mentioned, also other phosphorescent materials can be used within the building window. For example, the phosphorescent material can comprise zinc sulfide and/or strontium aluminate. The photoluminescent material can also be a traser. The traser can contain tritium, which emits electrons if illuminated by light, wherein the emitted electrons cause phosphors, which are also contained in the trasers, to glow.

Although in the embodiment described above with reference to FIG. 1 the building window has two transparent glass plates, in another embodiment the building window can comprise more than two transparent glass plates, in particular, three transparent glass plates. If more than two transparent glass plates form the building window, more than one internal space can be defined by these transparent glass plates and the photoluminescent material, in particular, sun blinds comprising the photoluminescent material, can be provided in one or more of the defined spaces between the transparent glass plates.

Although in the above described embodiments the window is a building window within a building, in other embodiments the window can also be used with another object like a car, a bus, a ship, an airplane, et cetera.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

The determinations like the determination of day or night and the control of the sun blind performed by one or several units or devices can be performed by any other number of units or devices. The determinations and/or the control of the sun blinds in accordance with the above described method for modifying the appearance of a building can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a window, in particular, a building window, wherein the window comprises photoluminescent material located within the window. The photoluminescent material is preferentially a phosphorescent material provided on a sun blind which is located within a sealed space between two transparent plates of the window. The photoluminescent material can be charged up by daylight and during the night the photoluminescent material can emanate light. Since the photoluminescent material is located within the window, the photoluminescent material is protected against environmental influences, in particular, against humidity, thereby increasing the lifetime of the photoluminescent material and, thus, of the window. The invention relates further to an object, in particular, a building, comprising the window, thereby giving the object an ambient glow.

The invention claimed is:

1. A lighting system comprising:
a window, comprising a photoluminescent material located therewithin; and
at least one of a time providing unit, a light sensor, a presence sensor and a movement sensor for generating at least one of a time signal, a light signal, a presence signal and a movement signal, wherein the light signal is indicative of ambient light and/or light emitted by the photoluminescent material, the presence signal is indicative of a presence of an object within a predefined area and the movement signal is indicative of a movement of an object within a predefined area, wherein the window comprises a sun blind integrated within the window and comprising the photoluminescent material, the system further comprising a control unit for controlling the sun blind depending on at least one of the time signal, the light signal, the presence signal and the movement signal.

2. The lighting system of claim 1, wherein the window comprises at least two transparent plates defining a sealed space, the photoluminescent material being located within the space.

3. The lighting system of claim 1, wherein the photoluminescent material is a phosphorescent material.

4. The lighting system of claim 1, wherein the sun blind comprises a first side and a second side and wherein at least one of the first side and the second side comprises the photoluminescent material.

5. The lighting system of claim 4, wherein the first side is covered with a first photoluminescent material and the second side is covered with a second photoluminescent material being different to the first photoluminescent material.

6. The lighting system of claim 1, wherein the sun blind comprises several lamellae being covered with the photoluminescent material.

7. The lighting system of claim 1, further comprising a light source for illuminating the photoluminescent material.

8. A lighting system comprising:
a window, comprising a photoluminescent material located therewithin; and
at least one of a time providing unit, a light sensor, a presence sensor and a movement sensor for generating at least one of a time signal, a light signal, a presence signal and a movement signal, wherein the light signal is indicative of ambient light and/or light emitted by the photoluminescent material, the presence signal is indicative of a presence of an object within a predefined area and the movement signal is indicative of a movement of an object within a predefined area, wherein the window comprises at least two transparent plates defining a sealed space, the photoluminescent material being located within the space.

* * * * *